United States Patent [19]

Dickinson et al.

[11] Patent Number: 4,726,696
[45] Date of Patent: Feb. 23, 1988

[54] MOLDED RUBBER SEAL FOR BEARING AND STAMPING ASSEMBLY

[75] Inventors: Thorn W. Dickinson, Berlin; David H. Morse, Wallingford, both of Conn.

[73] Assignee: The Torrington Company, Torrington, Conn.

[21] Appl. No.: 918,366

[22] Filed: Oct. 14, 1986

[51] Int. Cl.⁴ .................. F16C 33/76; F16C 23/00; F16J 9/06; F16J 15/32
[52] U.S. Cl. .................. 384/477; 384/486; 384/495; 277/152; 277/208
[58] Field of Search .................. 384/139–143, 384/145–147, 475, 477, 484–486, 483, 495–498, 460; 277/152, 208, 95, 70, 75

[56] References Cited

U.S. PATENT DOCUMENTS

| | | | |
|---|---|---|---|
| 2,858,176 | 10/1958 | Thompson | 384/477 |
| 3,141,710 | 7/1964 | Lehman | 384/477 |
| 3,195,904 | 7/1965 | Gilbert | 277/95 |
| 3,311,429 | 3/1967 | Kocian | 384/475 |
| 3,314,735 | 4/1967 | Kocian | 384/475 |
| 4,217,007 | 8/1980 | Filippa | 384/139 |
| 4,249,782 | 2/1981 | Frank | 384/147 X |
| 4,455,856 | 6/1984 | Salter, Jr. et al. | 277/152 X |

FOREIGN PATENT DOCUMENTS 503192  5/1954  Canada .................. 384/462

Primary Examiner—Stuart S. Levy
Assistant Examiner—Thomas R. Hannon
Attorney, Agent, or Firm—Hayes & Reinsmith

[57] ABSTRACT

A resilient annular bearing seal having an inner surface defining a central opening, an outer surface defining the seal outer periphery, and first and second side walls between the inner and outer surface and on opposite sides of the seal, the seal further having a circumferentially continuous sealing lip extending axially outwardly from the first side wall, the first side wall having a relieved portion adjacent to the sealing lip for receiving the sealing lip. The seal may include a sealing shoulder adjacent to the outer surface and the first side wall. The seal may also include at least one lip extending radially inwardly from the inner surface, and a sealing shield adjacent to the first side wall and the inner surface and extending both radially inwardly and axially outwardly. Also, a bearing assembly having an annular outer race; an annular housing surrounding the outer race and including side flanges extending radially inwardly; an inner race coaxially disposed relative to the outer race; and the annular seals of the present invention mounted on either side of the inner bearing race and contacting the outer bearing race, the sealing lips of the seal contacting the housing side flanges.

30 Claims, 1 Drawing Figure

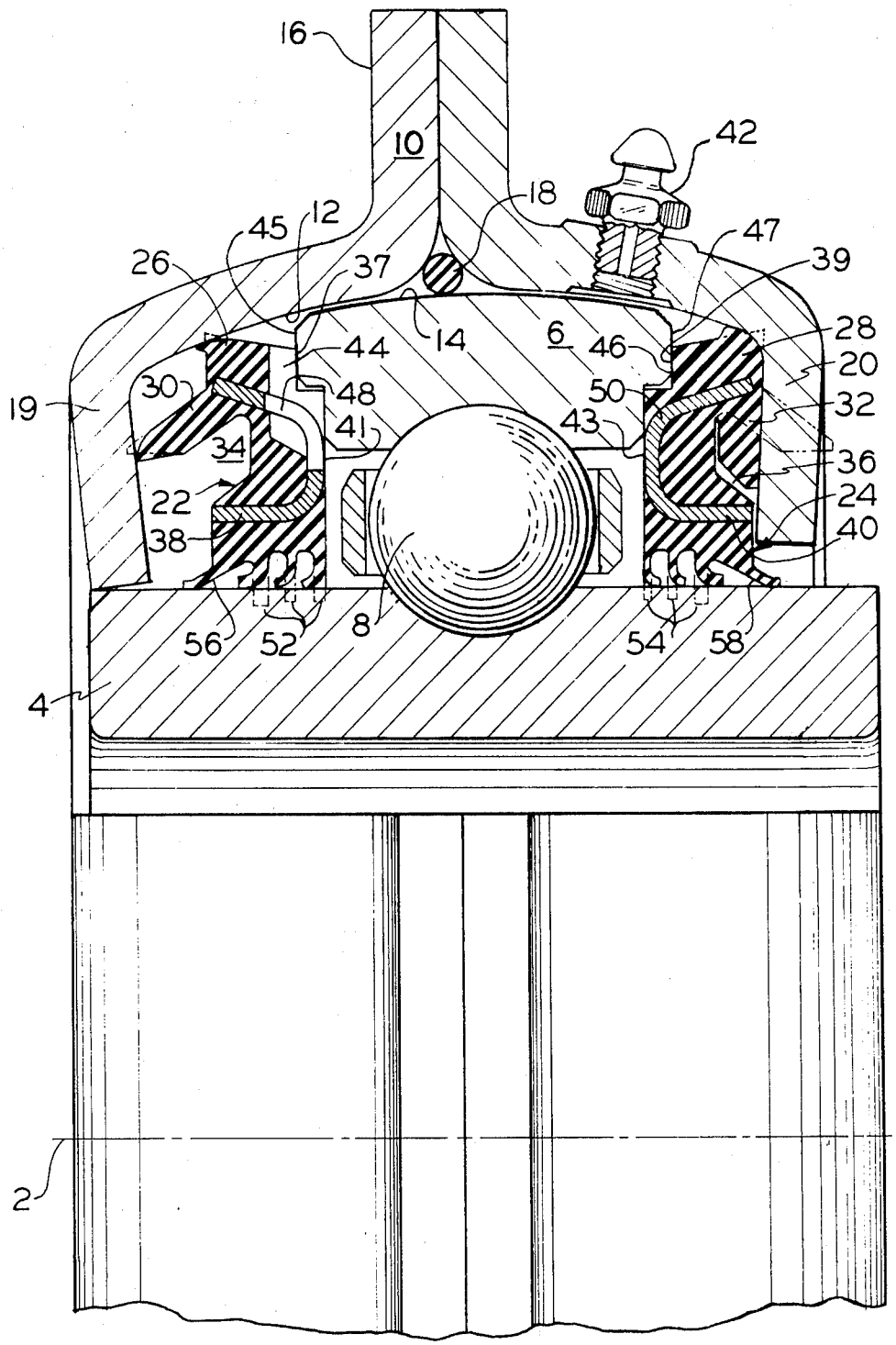

MOLDED RUBBER SEAL FOR BEARING AND STAMPING ASSEMBLY

BACKGROUND OF THE INVENTION

This invention relates to a bearing seal and, more specifically, to a seal for a self-aligning bearing.

Bearing assemblies are utilized in a wide variety of applications, including those in which the operating environment contains elements which are detrimental to the operation of the bearing, for example, dirt, grit and other particulates encountered in agricultural applications. If such particulates make their way into the bearing assembly and deposit on the bearing surfaces, these particulates can cause damage and substantially decrease the life and efficiency of the bearing.

Certain self-aligning bearings, for example, the bearings disclosed in U.S. Pats. Nos. 3,311,429 and 3,314,735, provide additional problems in that relative movement takes place between the bearing housing and the bearing outer race. The surface over which relative movement takes place must also be kept free of contaminants.

The prior art contains numerous examples of seals for bearings. In the aforementioned U.S. Pats. Nos. 3,311,429 and 3,314,735, there is disclosed an annular bearing seal on either side of ball bearing elements and between the inner and outer races of each bearing assembly. The outer periphery of each seal is secured within an annular retainer which is press-fitted within the outer race of the bearing. The inner surface of each seal defines a central hole and includes three lips which are directed radially inwardly and which contact the inner race of the bearing. When installed in the bearing, the three lips are pushed and held in axially outwardly direction by the inner race. The axially inwardly and outwardly facing side surfaces of each bearing seal are generally flat and are encased in a retainer.

In a variation of the above described seal made by the assignee of this application, an annular metal retainer contains an elastomeric seal and secures it within the outer bearing race. This metal retainer comprises a turned-over lip which mates with corresponding grooves in the outer race. The retainer is attached to the seal along the seal outer peripheral surface and axially outward side.

In short, many of the known designs mechanically lock the seals into the bearings, frequently requiring crimping of those seals into mating grooves formed in the outer ring.

While such sealed bearing assemblies have exhibited improved life in difficult environmental conditions, such assemblies have been complex and costly to manufacture and assemble in conventional antifriction bearing applications.

OBJECTS OF THE INVENTION

It is therefore an object of the present invention to improve the sealing of bearing elements and surfaces from environmental contamination.

It is another object of the present invention to provide a means for sealing a bearing which can be manufactured economically.

It is a further object of the present invention to provide means for sealing bearing and antifriction elements in a manner which simplifies both the manufacture and assembly of the bearing.

It is another object of the present invention to provide a self-aligning bearing with improved performance and life expectancy.

Other objects will be in part obvious and in part pointed out in more detail hereinafter.

SUMMARY OF THE INVENTION

The above and other objects, which will be apparent to those skilled in the art, are achieved by the present invention which comprises in one aspect a resilient annular bearing seal having an inner surface defining a central opening, an outer surface defining the seal outer periphery, and first and second side walls between the inner and outer surface and on opposite sides of the seal, the seal further having a circumferentially continuous sealing lip extending axially outwardly from the first side wall, the first side wall having a relieved portion adjacent to the sealing lip for receiving the sealing lip. The seal may include a sealing shoulder adjacent to the outer surface and the first side wall. The seal may also include at least one lip extending radially inwardly from the inner surface, and a sealing shield adjacent to the first side wall and the inner surface and extending both radially inwardly and axially outwardly.

In another aspect, the present invention comprises a bearing assembly having an annular outer race; an annular housing surrounding the outer race and including side flanges extending radially inwardly; an inner race coaxially disposed relative to the outer race; and the annular seals of the present invention mounted on either side of the inner bearing race and contacting the outer bearing race, the sealing lips of the seal contacting the housing side flanges.

BRIEF DESCRIPTION OF THE DRAWING

The sole FIGURE illustrates a longitudinal cross-section of a self-aligning bearing containing the seal of the present invention.

A better understanding of the objects, advantages, features, properties and relations of the invention will be obtained from the following detailed description and accompanying drawing which set forth an illustrative embodiment and is indicative of the way in which the principle of the invention is employed.

DETAILED DESCRIPTION OF THE INVENTION

The preferred embodiment of the seal of the present invention may be understood by reference to the FIGURE which illustrates the seal in place in a ball-bearing assembly. The bearing assembly is shown in a cross-section along the longitudinal axis 2 of the bearing. "Radial" and "axial" directions, as used herein, will be made with reference to bearing assembly longitudinal axis 2, unless otherwise indicated.

The bearing assembly comprises an outer race 6, an inner race 4 extending axially outwardly of the outer race, and ball bearing elements 8 between the two races. Encasing the outer race 6 is a housing 10 formed from pressed metal stampings. The housing 10 has an inner surface 12 that is configured to mate with the outer peripheral surface 14 of the bearing outer race 6. The housing inner surface 12 and the outer race outer peripheral surface 14 define complementary frusto-spherical surfaces. Limited angular movement, i.e., tilting of the bearing outer race relative to the housing may take place about an axis perpendicular to bearing longitudinal axis 2. In an alternative embodiment housing inner surface 12 and outer race surface 14 may define complementary cylindrical surfaces which permit relative axial movement.

The stamped housing 10 has a radially outwardly extending flange 16 which may be adapted to mount the assembly onto another structural element, for example, a disc harrow. When the housing is formed in two sections as shown, an "O" ring sealing element 18 may be used between the inner portion of the housing outwardly extending flange 16 and the outer periphery 14 of the outer race. Any conventional sealing means, for example, an adhesive or a gasket material, may be employed in place of the "O" ring shown. The "O" ring functions to prevent lubricant leakage when relubricating the antifriction elements of the bearing assembly and to isolate confronting surfaces of the outer race 14 and housing 10 from any contaminants which may penetrate the halves of the outer flange 16.

Housing side flanges 19 and 20 are axially spaced on either side of the outer race 6 and extend radially inwardly toward the bearing inner race 4. The housing side flanges 19 and 20 serve to protect the interior of the bearing assembly from contact with coarse contaminating material and also stabilize the bearing assembly during handling in assembly.

The antifriction bearing outer race 6 is shown in the FIGURE as being in maximum misalignment relative to housing 10. Left side flange member 19 is shown touching the bearing inner race 4 while right side flange member 20 is shown spaced apart a greater distance than normal from the bearing inner race 4.

The bearing seal of the present invention is shown at 22 and 24 on opposite sides of the ball bearing elements 8 of the antifriction bearing and is particularly designed to eliminate any necessity for complex and costly manufacturing operations normally required by conventional designs wherein the seals are integrally fixed to a bearing component. More specifically, the bearing seal 22, 24 is an annular member composed of a resilient elastomeric material which provides flexibility for, among other things, absorbing the applied forces due to bearing assembly misalignmant as described above. Those portions of the bearing seal which are deformed as a result of the bearing assembly misalignment are shown in phantom lines in their normally relaxed, as-formed configuration.

To achieve maximum flexibility in a construction featuring circumferentially continuous sealing and which is quick and easy to manufacture and assemble, each bearing seal 22, 24 has an annular sealing shoulder 26, 28 between the outer peripheral surface and the first or outer side wall of the annular member. The shoulder 26, 28 cross-section has a generally acute included angle, although any configuration is satisfactory as long as it is able to seal against the inner surface 12 of the housing 10. Extending axially outwardly from the outer side wall of the bearing seal 22, 24 is a sealing lip 30, 32. The outer side wall has a relieved portion 34, 36 disposed adjacent to and radially inwardly of the sealing lip. Relieved portion 34, 36 is capable of receiving the sealing lip when it is pressed axially inwardly against the outer side wall. Preferably, the cross-section of the relieved portion 34, 36 corresponds to the cross-section of the second sealing lip 30, 32 when it is received in the relieved portion. As shown in this preferred embodiment, the sealing lip has a radially inward component of orientation so that an axially applied force would tend to urge the sealing lip radially inwardly.

Sealing shoulder 26, 28 and sealing lip 30, 32 also serve to engage housing 10 and bias the seal axially inward toward the outer race 6. This helps to prevent rotation of the outer race and seals relative to the housing 10.

To simplify both the seal structure and its assembly, seal 22, 24 is formed with a relieved groove 37, 39 which extends circumferentially about the second or internal side wall 41, 43 of the seal 22, 24 and serves as a radial pilot to the outer bearing race 6 during assembly. Groove 37, 39 permits facile assembly of seal 22, 24 which may be simply disposed in position and then assembled upon bringing flanges 19, 20 into clamped engagement. This action secures seal 22, 24 in engagement with an outboard shoulder 45, 47 and the underlying outer side wall of seal 22, 24 without any need for crimping or other special assembly techniques.

The FIGURE illustrates the bearing assembly at maximum misalignment. During such misalignment the bearing seals continue to provide protection for the antifriction bearing components from outside contamination. In each seal, the sealing shoulder 26, 28 is shown in sealing engagement with the housing inner surface 12. Seal 22 is shown with the sealing lip 30 disposed in its entirety outside relieved portion 34, but still in sealing relationship with the housing 10, as is the sealing shoulder 26. Seal 24 is shown with the sealing lip fully received within its adjacent relieved portion 36 and also still providing a sealing relationship with the housing. When fully received in relieved portion 36, seal 24 forms a portion of an essentially flat bearing seal side wall.

An annular reinforcing member 38, 40 of U-shaped cross-section is shown embedded in each bearing seal 22, 24. The reinforcing member 38, 40 is coaxial with the annular sealing member 22, 24, with the base of the "U" aligned with the inner side wall of the bearing seal closest to the ball bearing elements 8. The reinforcing member is preferably made of a rigid material such as steel.

To further simplify the lubrication requirements, the design of the preferred embodiment is particularly directed to eliminate any need for drilling grease ports through the outer race. Rather, grease fitting 42, preferably self-tapping, is mounted in the housing 10 for injecting grease or other lubricants into the ball-bearing assembly along a path which extends around the outer race 6 and inside seal 22, 24. Grease is initially distributed after injection into the chamber between the outer race 6 and the housing inner surface 12. Lubricant contained in this chamber provides lubrication for the complementary surfaces of the shroud and the outer race. So that grease or other lubricants may be distributed into the vicinity of the ball bearing elements 8, the bearing seal 22, 24 may contain a plurality of individual relief openings or sections 44 (shown here only in seal 22) between the outer surface and the inner side wall to provide passageways for the grease. These individual lubrication relief sections are preferably spaced about the periphery of each annular seal. If a reinforcing member is employed, corresponding relief openings or sections 48 are provided therein so as to permit passage of lubricant.

To provide for sealing the ball bearing element region from contaminating particles and also to provide a one-way exit for excess lubricant when the bearing is to be relubricated, the seal member shown also includes a plurality of lips 52, 54 extending radially inwardly from the inner surface of the annular seal member. The lips 52, 54 contact the inner bearing race 4 adjacent either end and are held thereby with the lips oriented in opposite axially outward directions.

To provide additional protection against entry of contaminating material into the ball bearing element region, the seal of the present invention may also employ a sealing skirt 56, 58 adjacent to the seal outer side wall and inner surface. The sealing skirt 56, 58 extends axially outwardly of the outer side wall and also radially inward. Preferably, the sealing skirt 56, 58 also contacts the bearing inner race 4.

When molded from a suitable elastomeric material, the seal of this invention may be economically manufactured and assembled in an improved bearing assembly in a simplified design featuring better sealing performance. By virtue of the described construction, both the inner and outer races 4, 6 may be developed from simple turnings. Such construction eliminates spot facings, customized grooves and drilled holes commonly required in the races of known bearing assemblies. The bearing assembly of this invention is readily re-lubricated around the seal 22, 24 in contrast to "through" the bearing outer race as in certain prior art structures having extra concomitant manufacturing and assembly steps and costs.

While this invention has been described with reference to a specific embodiment, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A bearing seal comprising a resilient annular member having an inner surface defining a central opening, an outer surface defining the member outer periphery, and first and second side walls between said inner and outer surface and on opposite sides of said annular member, said member further having a circumferentially continuous sealing lip integrally formed on said first side wall and extending radially inwardly, said sealing lip being movable between a normally relaxed sealing condition extending axially outwardly from said first side wall and a compressed sealing condition, said first side wall having a relieved portion adjacent to said sealing lip and disposed radially inwardly of said sealing lip for receiving said sealing lip in its compressed sealing condition, a sealing shoulder adjacent to said outer surface and said first side wall, and said annular member including a sealing shield adjacent to said first side wall and said inner surface, said sealing shield extending radially inwardly with respect to said inner surface and axially outwardly with respect to said first side wall, whereby said sealing lip, said sealing shoulder and said sealing shield jointly cooperate to bias the seal axially inwardly with respect to said first side wall.

2. The seal of claim 1 wherein the cross-section of the first sidewall relieved portion corresponds to the cross section of the sealing lip when said lip is received in said relief portion.

3. The seal of claim 1 further comprising a reinforcing member embedded in said annular member.

4. The seal of claim 3 wherein said reinforcing member has an annular configuration and is coaxial with said resilient annular member.

5. The seal of claim 1 wherein said annular member includes a plurality of individual lubrication relief sections between said outer surface and said second side wall.

6. The seal of claim 1 wherein said annular member includes at least one lip extending radially inwardly from said inner surface.

7. The seal of claim 1 wherein said annular member includes a circumferentially extending relief groove about said second side wall.

8. A bearing assembly comprising an annular outer bearing race, an annular housing surrounding said outer bearing race, said housing including side flanges extending radially inwardly on either side of said outer bearing race, an inner bearing race coaxially disposed in said outer bearing race and extending axially outwardly of said outer bearing race, and annular seals coaxially mounted at either end of said inner bearing race and contacting said outer bearing race, said seals including a circumferentially continuous sealing lip integrally formed on a first said wall, said sealing lip being movable between a normally relaxed sealing condition extending axially outwardly from said first side wall and a compressed sealing condition, said sealing lip contacting said housing side flanges and biasing said seal toward said outer race, said seals each having a relieved portion adjacent to said sealing lip for receiving said sealing lip in its compressed sealing condition.

9. The bearing assembly of claim 8 wherein the outer race outer periphery and the housing inner surface define complementary frusto-spherical surfaces permitting tilting of said housing relative to the bearing outer race.

10. The bearing assembly of claim 9 wherein said seals each include a sealing shoulder adjacent to the seal outer surface, and wherein said sealing shoulder is in sealing contact with said housing and biases said seal toward said outer race.

11. The bearing assembly of claim 8 wherein said seal includes at least one radially inwardly extending lip contacting said inner race and held in an axially outwardly direction, and wherein said seal further includes a sealing skirt disposed axially outwardly of said lip and extending both radially inwardly and axially outwardly.

12. The bearing assembly of claim 11 wherein said sealing skirt contacts said inner race.

13. The bearing assembly of claim 8 additionally comprising rolling contact elements between said inner and outer races.

14. The bearing assembly of claim 8 wherein the cross-section of said relieved portion corresponds to the cross-section of the sealing lip when said lip is received in said relieved portion.

15. The bearing assembly of claim 8 wherein said sealing lip also extends radially inwardly and wherein said relieved portion is radially inwardly of said sealing lip.

16. The bearing assembly of claim 8 wherein a reinforcing member is embedded in each of said seals.

17. The bearing assembly of claim 16 wherein said reinforcing member has an annular configuration and is coaxial with said seal.

18. The bearing assembly of claim 8 wherein said annular seal includes a plurality of individual lubrication relief sections spaced about the periphery thereof.

19. The bearing assembly of claim 18 wherein a reinforcing member is embedded in each of said seals, said reinforcing member having relief sections coincident with said seal relief sections.

20. The bearing assembly of claim 8 further including a seal between the outer race outer periphery and the housing inner surface.

21. The bearing assembly of claim 8 wherein said annular seals include a circumferentially extending relief groove on the side adjacent to said outer race for engaging said outer race.

22. A bearing assembly comprising an annular outer bearing race having a frusto-spherical outer peripheral surface, an annular housing surrounding said outer bearing race and having a frusto-spherical inner surface complementary to said outer race outer peripheral surface permitting tilting of said housing relative to said bearing outer race, said housing including side flanges extending radially inwardly on either side of said outer bearing race, an inner bearing race coaxially disposed in said outer bearing race and extending axially outwardly of said outer bearing race, and annular seals coaxially mounted at either end of said inner bearing race and contacting said outer bearing race, said seals including a sealing shoulder adjacent to the seal outer surface in sealing contact with said housing and a circumferentially continuous sealing lip integrally formed on a first side wall, said sealing lip being movable between a normally relaxed sealing condition extending axially outwardly from said first side wall and a compressed sealing condition, said sealing lip contacting said housing side flanges, said sealing shoulder and said sealing lip both biasing said seal toward said bearing outer race, said seals each having a relieved portion disposed adjacent to and radially inwardly of said sealing lip for receiving said sealing lip in its compressed sealing condition, said seals further having a reinforcing member embedded therein.

23. The bearing assembly of claim 22 wherein said seal includes at least one lip extending radially inwardly and contacting said inner race and held in an axially outwardly oriented direction, and wherein said seal further includes a sealing shield disposed axially outwardly of said lip and extending both radially inwardly and axially outwardly.

24. The bearing assembly of claim 23 wherein said sealing skirt contacts said inner race.

25. The bearing assembly of claim 22 additionally comprising rolling contact elements between said inner and outer races.

26. The bearing assembly of claim 22 wherein the cross-section of said relieved portion corresponds to the cross-section of the sealing lip when said lip is received in said relieved portion.

27. The bearing assembly of claim 22 wherein said reinforcing member has an annular configuration and is coaxial with said seal.

28. The bearing assembly of claim 22 wherein said annular seal and said reinforcing member include a plurality of coincident individual lubrication relief sections spaced about the periphery thereof.

29. The bearing assembly of claim 28 further including a seal between the outer race outer periphery and the housing inner surface.

30. The bearing assembly of claim 22 wherein said annular seals include a circumferentially extending relief groove on the side adjacent to said outer race for engaging said outer race.

* * * * *